(12) United States Patent
Danielewicz et al.

(10) Patent No.: US 8,544,267 B2
(45) Date of Patent: Oct. 1, 2013

(54) ENGINE ASSEMBLY AND METHOD OF MAKING

(75) Inventors: Curt R. Danielewicz, Macomb, MI (US); Brian J. Edwards, Macomb, MI (US); Hardo Barths, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 13/109,066

(22) Filed: May 17, 2011

(65) Prior Publication Data

US 2011/0277466 A1 Nov. 17, 2011

Related U.S. Application Data

(60) Provisional application No. 61/345,479, filed on May 17, 2010.

(51) Int. Cl.
| | |
|---|---|
| *F02B 23/00* | (2006.01) |
| *F01N 1/00* | (2006.01) |
| *F01N 13/08* | (2010.01) |
| *F16L 39/00* | (2006.01) |
| *F16L 41/00* | (2006.01) |
| *F16L 45/00* | (2006.01) |
| *F16L 51/00* | (2006.01) |
| *F02F 11/00* | (2006.01) |
| *B21K 3/00* | (2006.01) |
| *B23P 6/00* | (2006.01) |
| *F01D 1/02* | (2006.01) |
| *F04D 29/44* | (2006.01) |
| *F04D 29/54* | (2006.01) |

(52) U.S. Cl.
USPC .......... 60/602; 60/323; 285/133.11; 277/592; 277/593; 29/888.01; 29/888.011; 29/888.021; 415/203

(58) Field of Classification Search
USPC ........ 60/602, 311, 598, 321–323; 29/888.01, 29/888.021, 888.011, 525.01; 285/61, 133.11, 285/405, 637, 233; 277/592–593; 415/203
IPC ............ F02B 39/00, 37/00, 37/02; F01N 13/08, F01N 7/08; F16J 15/06
See application file for complete search history.

(56) References Cited

U.S. PATENT DOCUMENTS 4,414,725 A * 11/1983 Breitweiser et al. ..... 29/888.011
4,503,680 A * 3/1985 Wood ............................ 285/233
(Continued)

FOREIGN PATENT DOCUMENTS

CN 101440755 5/2009
CN 201679559 U * 12/2010
(Continued)

OTHER PUBLICATIONS

Office Action regarding related Case No. CN201110168929.1; dated Jun. 5, 2013; 23 pgs.

*Primary Examiner* — Thai Ba Trieu
(74) *Attorney, Agent, or Firm* — Cantor Colburn LLP (57) ABSTRACT

An engine assembly comprising a cylinder head, turbocharger in fluid communication with the cylinder head and exhaust conduit in fluid communication with the turbocharger and method of making the assembly using a single human assembler includes: mounting the turbine to the cylinder head; using a first assembly aid to form a slidable joint between the exhaust conduit and head; using a second assembly aid to form a movable joint between the turbine and exhaust conduit and align the turbine outlet flange and exhaust conduit inlet flange; using a third assembly aid to pilotingly engage the flanges; disposing a clamp about the turbine outlet flange and the exhaust conduit inlet flange; tightening the second assembly aid sufficiently to form an immovable joint; tightening the clamp to form a sealed joint between the flanges; and tightening the first assembly aid to form a fixed joint.

20 Claims, 11 Drawing Sheets

(56) References Cited

U.S. PATENT DOCUMENTS

| | | | |
|---|---|---|---|
| 4,514,986 A * | 5/1985 | Benson | 60/323 |
| 4,709,548 A | 12/1987 | Conrad et al. | 60/311 |
| 5,078,963 A * | 1/1992 | Mallen | 420/443 |
| 5,295,300 A * | 3/1994 | Garrick, Jr. | 29/888.021 |
| 5,406,795 A * | 4/1995 | Raub et al. | 60/605.1 |
| 6,256,990 B1 * | 7/2001 | Itoh | 60/323 |
| 6,378,309 B1 * | 4/2002 | Divecha et al. | 60/612 |
| 6,688,103 B2 * | 2/2004 | Pleuss et al. | 60/323 |
| 6,928,816 B2 | 8/2005 | Leavesley | |
| 7,043,915 B2 * | 5/2006 | Anello | 248/637 |
| 7,089,737 B2 * | 8/2006 | Claus | 60/323 |
| 7,784,442 B2 | 8/2010 | Lester et al. | |
| 7,802,428 B2 * | 9/2010 | Perrin et al. | 60/602 |
| 7,810,466 B2 * | 10/2010 | Preimesberger et al. | 60/598 |
| 2004/0244372 A1 | 12/2004 | Leavesley | |
| 2005/0161944 A1 * | 7/2005 | Woods | 285/133.11 |
| 2006/0131817 A1 * | 6/2006 | Kerelchuk | 277/592 |
| 2007/0216109 A1 * | 9/2007 | Friedow | 277/593 |
| 2008/0066465 A1 * | 3/2008 | Maidens | 60/599 |
| 2009/0126659 A1 * | 5/2009 | Lester et al. | 60/598 |
| 2009/0252599 A1 * | 10/2009 | Cavagnaro et al. | 415/119 |
| 2010/0223911 A1 * | 9/2010 | Gockel et al. | 60/323 |
| 2011/0132296 A1 * | 6/2011 | Kuhlbach | 123/41.82 R |
| 2011/0302920 A1 * | 12/2011 | Cuniberti et al. | 60/605.3 |
| 2012/0070274 A1 * | 3/2012 | Ferrazzi | 415/203 |
| 2012/0255528 A1 * | 10/2012 | Gunkel et al. | 29/888.01 |

FOREIGN PATENT DOCUMENTS

| | | | |
|---|---|---|---|
| CN | 201925047 U | * | 8/2011 |
| DE | 19645384 A1 | | 5/1998 |
| FR | 2916731 | | 12/2008 |
| FR | 2925586 A3 | * | 6/2009 |
| JP | 58119927 A | * | 7/1983 |
| JP | 11006440 A | * | 1/1999 |
| JP | 11229863 | | 8/1999 |
| JP | 2001050046 | | 2/2001 |
| JP | 2009167971 A | * | 7/2009 |
| JP | 2011127576 A | * | 6/2011 |
| WO | WO 2008113924 A2 | * | 9/2008 |

* cited by examiner

ENGINE ASSEMBLY AND METHOD OF MAKING

CROSS REFERENCE TO RELATED APPLICATIONS

This application claims priority to U.S. Provisional Patent Application Ser. No. 61/345,479 filed on May 17, 2010, which is incorporated herein by reference in its entirety.

FIELD OF THE INVENTION

The subject invention relates to an internal combustion engine assembly and method of making the assembly and, more particularly, to an engine, turbocharger and exhaust system assembly and a method of making the assembly and, even more particularly, to a cylinder head, turbine and exhaust conduit assembly and method of making the assembly.

BACKGROUND

Internal combustion engines, such as those used in various automotive vehicles, frequently require compact arrangement of a number of vehicular components and systems in the engine compartment. This frequently requires close and compact arrangement and synchronized, interconnecting attachment of these components and systems during the assembly process. This arrangement presents challenges during the assembly process, as well as afterward in-service, where removal and repair or replacement and reassembly may be desirable.

For example, it is sometimes the case where two or more components must be assembled to one another where the assembly requires simultaneous alignment and assembly of several components and associated joints, where the action of more than one human operator is needed to perform the alignment and assembly, but where there is insufficient space in the assembly envelope for more than one operator to work. In these cases, the design of the components and the assembly process must be adapted for assembly by a single operator.

Accordingly, it is desirable to provide engine assemblies that include multiple components and that are adapted for alignment and assembly of the components by a single human assembly operator.

SUMMARY OF THE INVENTION

In one exemplary embodiment of the invention, an engine assembly is disclosed. The engine assembly includes a cylinder head having an exhaust port and an exhaust port mounting flange disposed proximate the exhaust port. The assembly also includes a turbocharger having a turbine, the turbine having a turbine housing, the turbine housing comprising a turbine inlet and turbine outlet, the turbine inlet configured to receive an exhaust flow from the exhaust port and fluidly communicate the exhaust flow through the turbine housing to the turbine outlet, the turbine inlet comprising a turbine inlet mounting flange that is removably mounted on and in sealed engagement with the exhaust port mounting flange, the turbine outlet comprising a turbine outlet mounting flange. The assembly also includes an exhaust conduit, the exhaust conduit comprising an exhaust conduit inlet, the exhaust conduit inlet configured to receive the exhaust flow from the turbine outlet, the exhaust conduit inlet comprising an exhaust conduit inlet mounting flange that is removably mounted on and in sealed engagement with the turbine outlet flange. The assembly further includes a first assembly aid disposed between the exhaust conduit and the cylinder head; a second assembly aid axially disposed between the turbine housing proximate the turbine outlet and the exhaust conduit proximate the exhaust conduit inlet and configured to provide alignment of the turbine outlet flange and exhaust conduit inlet mounting flange and a third assembly aid disposed circumferentially about and configured to provide nested engagement of the turbine outlet and the exhaust conduit inlet. Still further, the assembly includes a clamp configured for sealing attachment of the exhaust conduit inlet mounting flange to the turbine outlet mounting flange, wherein the first assembly aid comprises a joint between the cylinder head and the exhaust conduit, the second assembly aid comprises a first joint between the turbine and the exhaust conduit and the third assembly aid comprises a second joint between the turbine and the exhaust conduit.

In another exemplary embodiment of the invention, a method of making an engine assembly comprising: a cylinder head having an exhaust port and an exhaust port mounting flange disposed proximate the exhaust port; a turbocharger having a turbine, the turbine having a turbine housing, the turbine housing comprising a turbine inlet and turbine outlet, the turbine inlet configured to receive an exhaust flow from the exhaust port and fluidly communicate the exhaust flow through the turbine housing to the turbine outlet, the turbine inlet comprising a turbine inlet mounting flange that is removably mounted on and in sealed engagement with the exhaust port mounting flange, the turbine outlet comprising a turbine outlet mounting flange; an exhaust conduit, the exhaust conduit comprising an exhaust conduit inlet, the exhaust conduit inlet configured to receive the exhaust flow from the turbine outlet, the exhaust conduit inlet comprising an exhaust conduit inlet mounting flange that is removably mounted on and in sealed engagement with the turbine outlet flange; a first assembly aid disposed between the exhaust conduit and the cylinder head; a second assembly aid axially disposed between the turbine housing proximate the turbine outlet and the exhaust conduit proximate the exhaust conduit inlet and configured to provide alignment of the turbine outlet flange and exhaust conduit inlet mounting flange; a third assembly aid disposed circumferentially about and configured to provide nested engagement of the turbine outlet and the exhaust conduit inlet; and a clamp configured for sealing attachment of the exhaust conduit inlet mounting flange to the turbine outlet mounting flange, wherein the first assembly aid comprises a joint between the cylinder head and the exhaust conduit, the second assembly aid comprises a first joint between the turbine and the exhaust conduit and the third assembly aid comprises a second joint between the turbine and the exhaust conduit; using a single human assembler is disclosed. The method includes: removably and sealably mounting the turbine inlet mounting flange to the exhaust port mounting flange; using the first assembly aid to form a slidable joint and dispose the exhaust conduit on the cylinder head; using the second assembly aid to form a movable joint between the turbine housing and the exhaust conduit and movably align and dispose the turbine outlet flange on the exhaust conduit inlet flange; using the third assembly aid to pilotingly engage the turbine outlet flange and the exhaust conduit inlet flange; circumferentially disposing the clamp about the turbine outlet flange and the exhaust conduit inlet flange; tightening the second assembly aid sufficiently to form an immovable joint between the turbine housing and the exhaust conduit; tightening the clamp to form a sealed joint between the turbine outlet flange and the exhaust conduit inlet flange; and tightening the first assembly aid to form a fixed joint and dispose the exhaust conduit on the cylinder head.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Turbochargers are increasingly being employed to satisfy engine power output, efficiency, packaging and other requirements. Vehicles that employ turbochargers frequently require simultaneous assembly of the exhaust system to the engine and the turbocharger. This assembly is particularly problematic for some configurations of the turbocharger and exhaust system in relation to the engine, such as, for example, when the turbocharger and connection to the exhaust system are located on the side of the engine, particularly on the side of the cylinder head, in contrast to configurations where the turbocharger and exhaust system connection are located on top of the engine or between opposing cylinder banks. Such cylinder head, turbocharger and exhaust system configurations are typically compact and have a very restricted space envelope for the operator to align the components while making the sealed connections between them. They require making several connections simultaneously, more than can be made by a single human operator, but do not afford a sufficient space envelope for more than one human operator to make the connections, or where intervention of a second human operator is otherwise undesirable.

Figure 13:
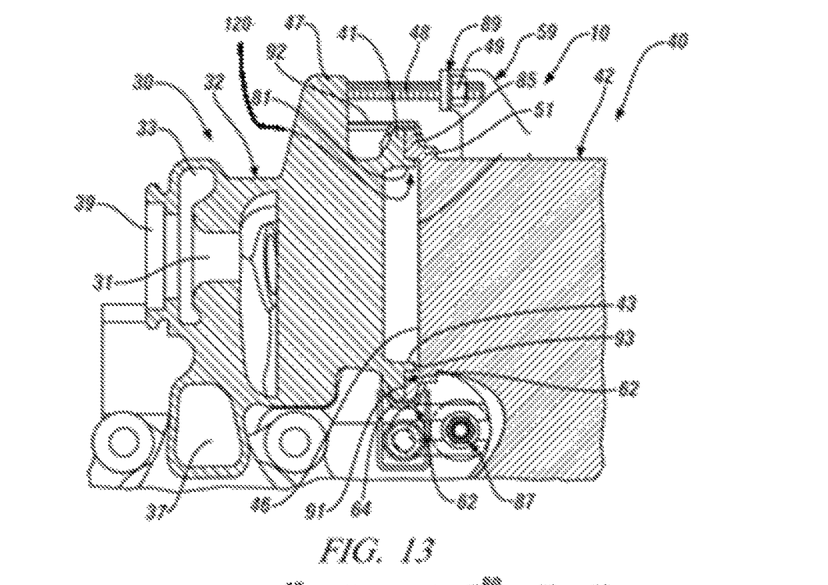
FIG. 13 is a cross-sectional view of the assembly of FIG. 12 taken along section 13-13.
Figure 14:
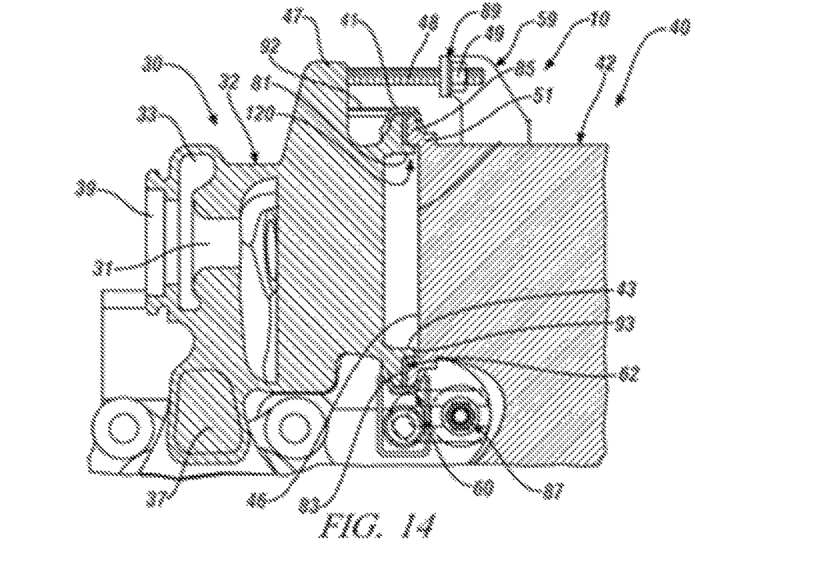
FIG. 14 is a cross-sectional view of a second exemplary embodiment of an assembly of a cylinder head, turbine, and exhaust conduit that also includes an exhaust gasket as disclosed herein.

Referring to FIGS. 1-14, in accordance with an exemplary embodiment of the present invention, an assembly 10 (FIGS. 12-14) that includes an engine 20, turbocharger 30 and exhaust system 40 is disclosed wherein the exhaust system 40 may be simultaneously attached to the turbocharger 30 and engine 20 by a single human operator (not shown). More particularly, the assembly 10 includes an engine 20 cylinder head 22, turbocharger 30 turbine 32 and exhaust conduit 42, where the turbine 32 and exhaust conduit 42 are sealingly joined together and in fluid communication through a first exhaust conduit joint 62 (FIGS. 9-14) by a clamp 60 and the exhaust conduit 42 is mechanically fixed to the cylinder head 22 by a joint 87 (FIGS. 11 and 12) to the turbine 32 by a joint 89 (FIGS. 13 and 14).

Figure 1:
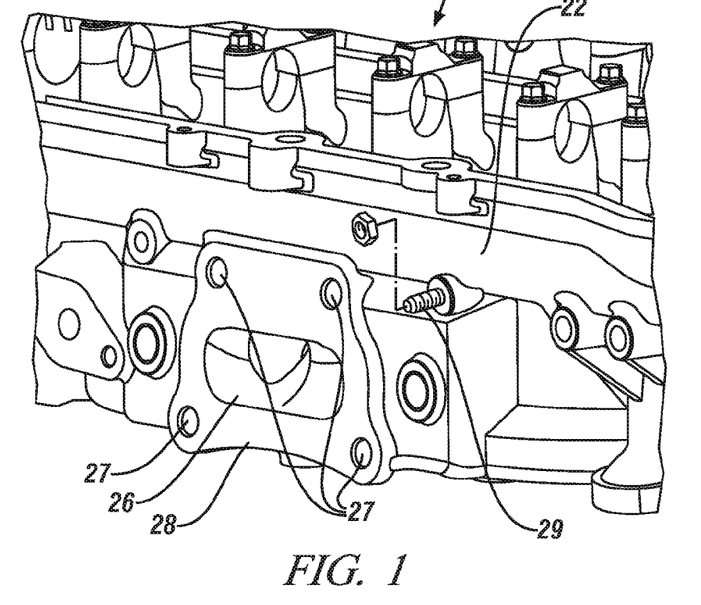
FIG. 1 is a perspective view of a cylinder head used in a exemplary embodiment of a cylinder head, turbine and exhaust conduit assembly as disclosed herein.
Figure 2:
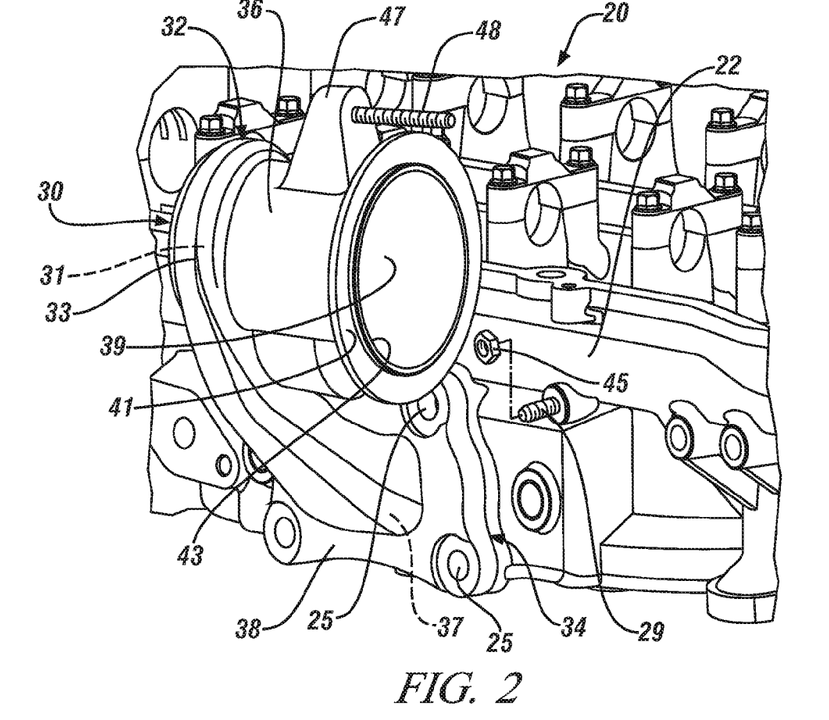
FIG. 2 is a perspective view of an exemplary embodiment of cylinder head and turbine subassembly as disclosed herein.

Referring to FIG. 1, an internal combustion engine 20 comprising cylinder head 22 is disclosed. The cylinder head 22 includes an exhaust port 26. The exhaust port 26 may be associated in fluid communication with one or more cylinders (not shown) of the engine 20. The exhaust port 26 may also, optionally, be associated with an intermediate exhaust manifold (not shown) that is in fluid communication with the cylinder or cylinders of the engine 20, such as a manifold that is adapted to receive exhaust gas flows from a plurality of cylinders. The cylinder head 22, or an intermediate exhaust manifold if employed, also includes an exhaust port mounting flange 28 surrounding the exhaust port 26 for mounting the turbine 32 of turbocharger 30 (FIG. 2). The mounting flange 28 may, for example, incorporate a plurality of threaded bores 27 that are adapted to receive a corresponding plurality of threaded bolts (not shown), or alternately a plurality of threaded studs (not shown) that are adapted to receive a corresponding plurality of threaded nuts (not shown). The cylinder head 22 also includes an outwardly extending threaded stud 29. The threaded stud 29 extends outwardly sufficiently to engage a cylinder head or first bracket 44 and be attached to the bracket by a threaded nut 45 (FIG. 12) or similar fastener as described herein. The threaded stud 29, cylinder head or first bracket 44 and threaded nut 45 comprise a first assembly aid 100 (FIGS. 10 and 12) by providing a slidable joint between the cylinder head 22 and the exhaust conduit 42 when a slotted opening in the first bracket 44 is placed over the threaded stud 29 and the threaded nut 45 is finger-tightened onto the stud 29. This joint may later be converted to a fixed joint in conjunction with completion of the assembly 10. Alternately, the threaded stud 29 may be replaced by a threaded bore (not shown) that is configured to receive a threaded bolt (not shown) for engagement and attachment of the cylinder head mounting bracket 44. The engine 20 and cylinder head 22 may be made from any suitable material, including various cast ferrous alloys or cast aluminum alloys. The threaded stud 29 and an associated threaded nut 45 may be formed from any suitable material, including various grades of high-strength steel or stainless steel.

Figure 3A:
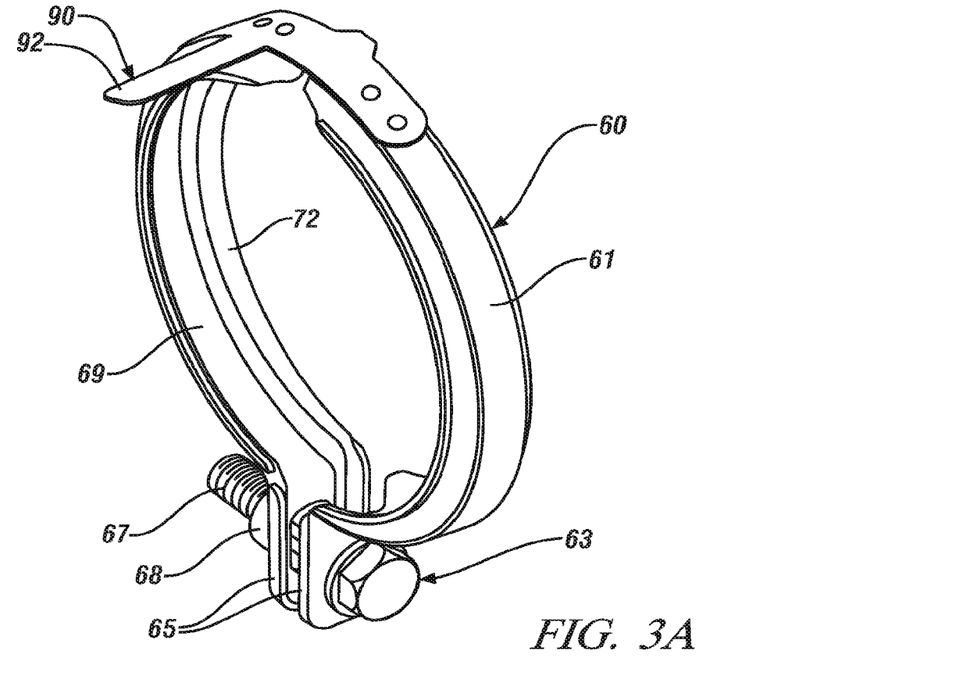
FIG. 3A is an exemplary embodiment of a clamp as disclosed herein.
Figure 3B:
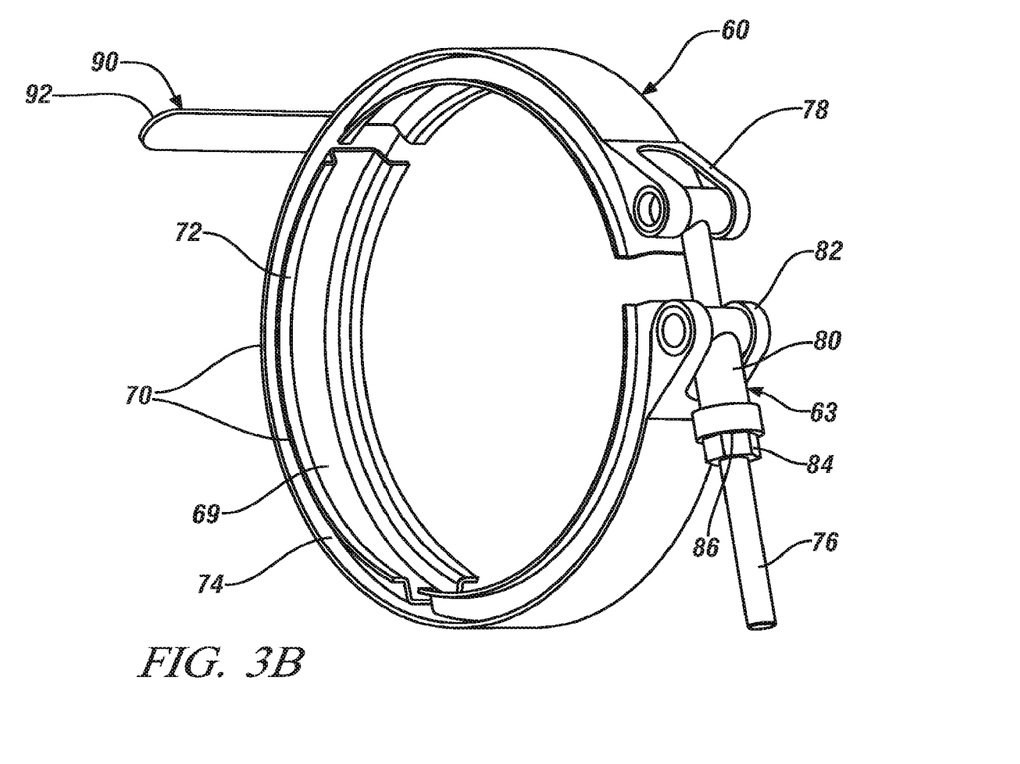
FIG. 3B is a second exemplary embodiment of a clamp as disclosed herein
Figure 4:
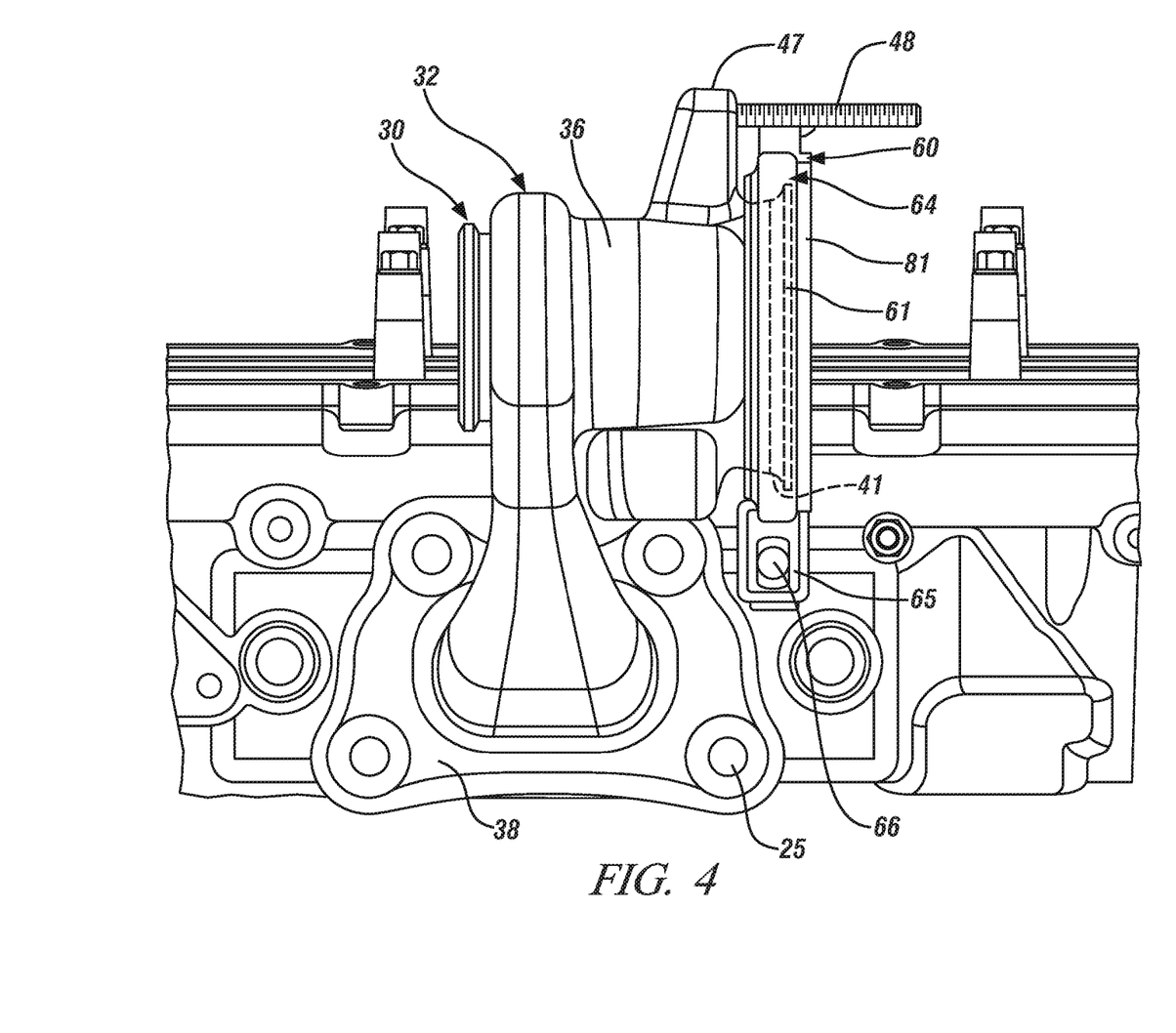
FIG. 4 is a perspective view of an exemplary embodiment of cylinder head, turbine and clamp subassembly as disclosed herein.

Referring to FIGS. 2-5, turbocharger 30 includes turbine 32. The turbine 32 includes turbine housing 36 having a turbine inlet 37 that is encompassed within the turbine inlet flange 38. The turbine inlet flange 38 of the turbine housing 36 is configured for sealing engagement with the exhaust port mounting flange 28 (FIG. 1) of the cylinder head 22 and includes a plurality of mounting bosses 25 numerically and positionally corresponding to the plurality threaded bores 27 of the exhaust port mounting flange 28. As illustrated, for example, in FIG. 13, the turbine inlet 37 is in fluid communication with an internal airflow passage 31 within the turbine volute 33 that is in turn in fluid communication with the turbine outlet 39. The turbine outlet 39 has a turbine outlet flange 41 for attachment to the exhaust conduit 42 and a circumferential, axially outwardly extending or protruding pilot portion 43 that is configured to engage the counterbore 93 of the exhaust conduit inlet 46. The turbine housing 36 also includes a radially protruding arm 47 proximate the turbine outlet 39 and the turbine outlet flange 41. The radially protruding arm 47 includes an axially extending threaded stud 48, which preferably extends outwardly away from the turbine outlet 39 beyond the turbine outlet flange 41. The turbine 32 and exhaust conduit 42 are configured so that an exhaust gas flow F (FIG. 11) from engine 10 enters the turbine inlet 37 from the exhaust port 26 and passes through the turbine 32, as described, to the turbine outlet 39 where it exits the turbine 32 and enters the exhaust system 40 through the exhaust conduit 42. In accordance with an exemplary method 200 of making the assembly 10 described herein, the turbine 32 of the turbocharger 30 is attached through the turbine inlet flange 38 to the cylinder head 22 to form a sealed turbine joint 34 (FIG. 2) between them. Once attached, in accordance with the exemplary embodiment of the method 200 of making the assembly 10, an exhaust conduit retainer or clamp 60 is expanded and placed over the turbine outlet flange 41 as shown in FIG. 4. This pre-positioning of the clamp 60 is preferably done prior to attachment of the other elements of the assembly 10 to reduce the amount that the clamp must be opened to achieve placement proximate the turbine outlet 39. The turbine housing 36 may be made from any suitable high temperature material, including various cast ferrous alloy materials. The threaded stud 48 and an associated nut 49 may also be made from any suitable material, including various grades of stainless steel.

Referring to FIGS. 3A and 3B, exemplary embodiments of a clamp 60 are shown. Any suitable clamp that is configured to provide a clamping force sufficient to provide sealing engagement of the turbine 32 and exhaust conduit 42 may be used, including a V-band clamp 64 that is configured to provide sealed pressing engagement of the turbine outlet flange 41 and the exhaust conduit inlet flange 51 and sealed fluid communication between the turbine outlet 39 and the exhaust conduit inlet 46. In one embodiment, the V-band clamp 64 may include a V-band 61 having opposed ends 65 that project radially outwardly and are configured with a bore 66 (FIG. 4) to receive a clamping device 63, such as a threaded bolt 67 and nut 68 as shown in FIG. 3A. Alternately, the V-band clamp 64 may include a two-part band 70 that includes an inner V-band 72 and outer tightening band 74, wherein the outer band 74 includes a clamping device 63, such as a swivel-end threaded rod 76 that is placed in a looped end 78 of the tightening band 74 and is adapted to engage a swivel-end bushing 80 that is placed in an opposed looped end 82 of the tightening band 74 and is tightened by turning a threaded nut 84 against the end 86 of the swivel end bushing as shown in FIG. 3B. Referring to FIGS. 3A and 3B, the V-band clamps 64 may also include an anti-rotation feature 90 such as a tang 92 or other suitable feature that extends outwardly toward the radially protruding arm 47 sufficiently to prevent rotation of the feature past the arm when the V-shaped channel 69 of the V-band clamp 64 is placed over the turbine outlet flange 41 as shown, for example, in FIG. 8. The anti-rotation feature 90 may be located circumferentially on the clamp 60 so that the clamping device 63 is positioned to provide access to the human operator for tightening the device. The clamp 60 may be made from any suitable high temperature material, including various grades of steel, particularly various grades of stainless steel.

Figure 5:
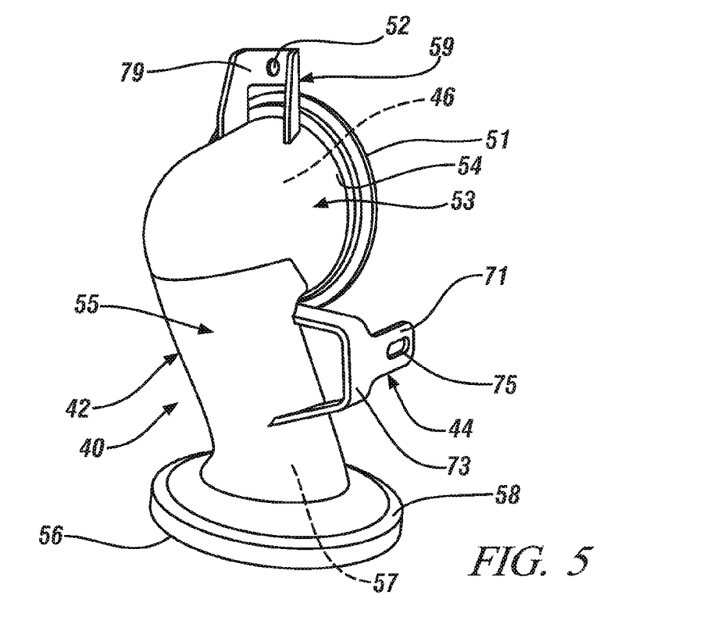
FIG. 5 is an exemplary embodiment of an exhaust conduit as disclosed herein.

A portion of exhaust system 40 is shown in FIG. 5. This may include any suitable portion of the exhaust system 40, including a discrete exhaust conduit 42 as shown in FIG. 5. While illustrated as a discrete exhaust conduit 42, the exhaust system 40 described and conduit 42 may also include a conduit portion of an exhaust component, such as a filter, catalyst or the like. In the exemplary embodiment of FIG. 5, the discrete exhaust conduit 42 has a form of an acute angle elbow or a substantially L-shaped elbow; however, any suitable discrete conduit form may be used. The exhaust conduit 42 has an inlet leg 53 having an inlet end 54, exhaust conduit inlet 46 and exhaust conduit inlet flange 51 and an outlet leg 55 having an outlet end 56, exhaust conduit outlet 57 and exhaust conduit outlet flange 58. The inlet leg 53 has a substantially U-shaped turbine or second bracket 59 that includes a bore 52 in the base 79 of the U that is adapted to receive the threaded stud 48 of the protruding arm 47 for attachment of the turbine 32 to the exhaust conduit 42 using a threaded nut 49 or similar threaded fastener. The turbine bracket 59, threaded stud 48 and threaded nut 49 comprise a second assembly aid 110 (FIGS. 10-12) by providing a joint between the turbine 32 and the exhaust conduit 42 when a bore 52 in the second bracket 59 is placed over the threaded stud 48 and the threaded nut 49 is finger-tightened onto the stud 48. The outlet leg 55 has a substantially U-shaped cylinder head bracket 44 that includes an arm 71 projecting from the base 73 of the U that extends substantially parallel to the inlet leg 53 and is configured for opposing relation to the cylinder head 22 and receipt therein of the threaded stud 29 that is attached thereto. The exhaust conduit 42, turbine bracket 59 and cylinder head bracket 44 may be made from any suitable high temperature material, including various grades steel, particularly various grades of stainless steel.

Figure 6:
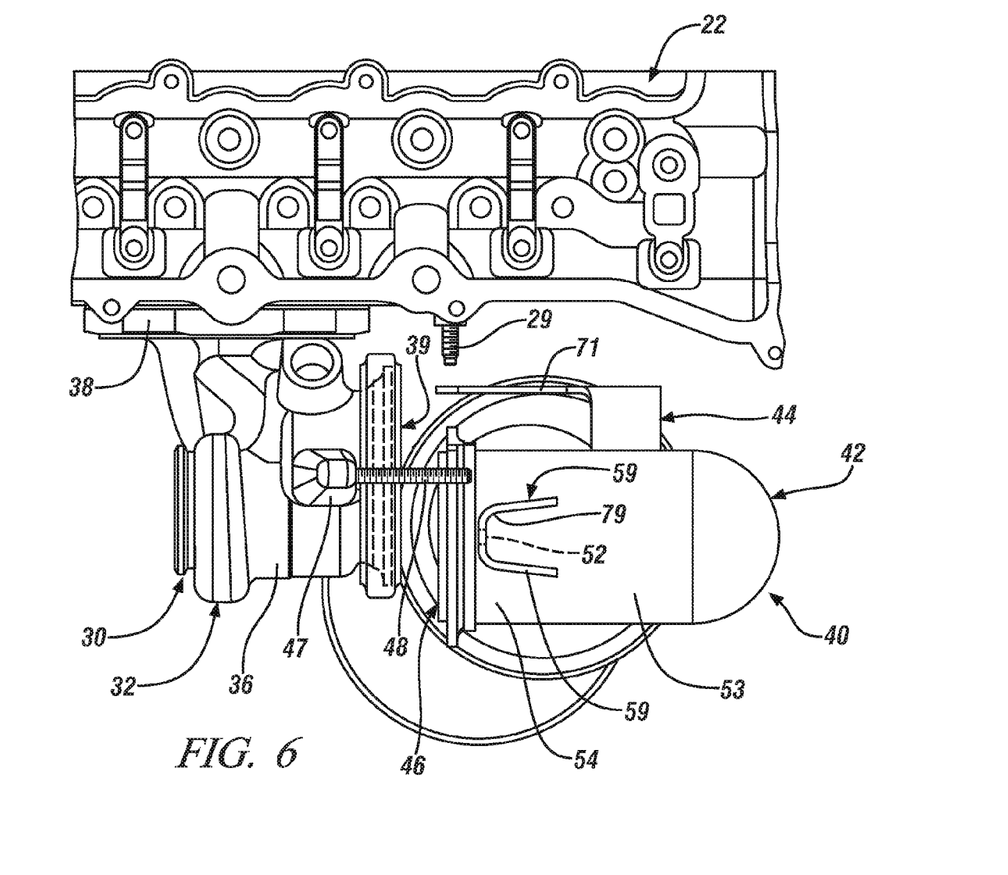
FIG. 6 is a perspective view of the subassembly of FIG. 4 and the exhaust conduit of FIG. 5 prepositioned and aligned for assembly thereto.

As shown in FIG. 6, in accordance with the method 200 of making the assembly 10, the exhaust conduit 42 is pre-positioned by a human operator with the turbine outlet 39 proximate the exhaust conduit inlet 46, the outwardly extending stud 29 proximate the slot 75 of the cylinder head bracket 44 and the outwardly extending stud 48 of the protruding arm 47 proximate the bore 52 in the turbine bracket 59.

Figure 7:
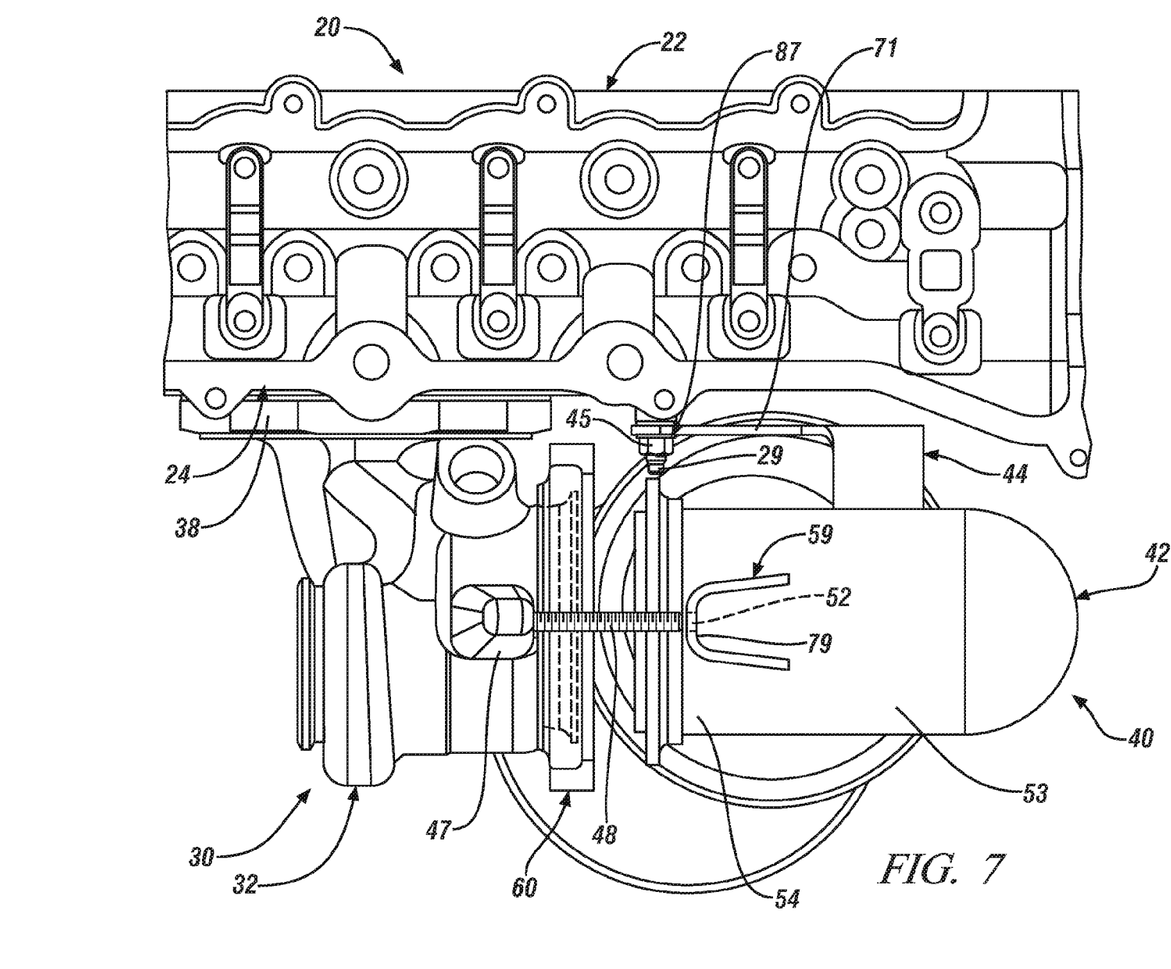
FIG. 7 is a top perspective view as in FIG. 6 wherein the exhaust conduit is moveably attached to the cylinder head.
Figure 8:
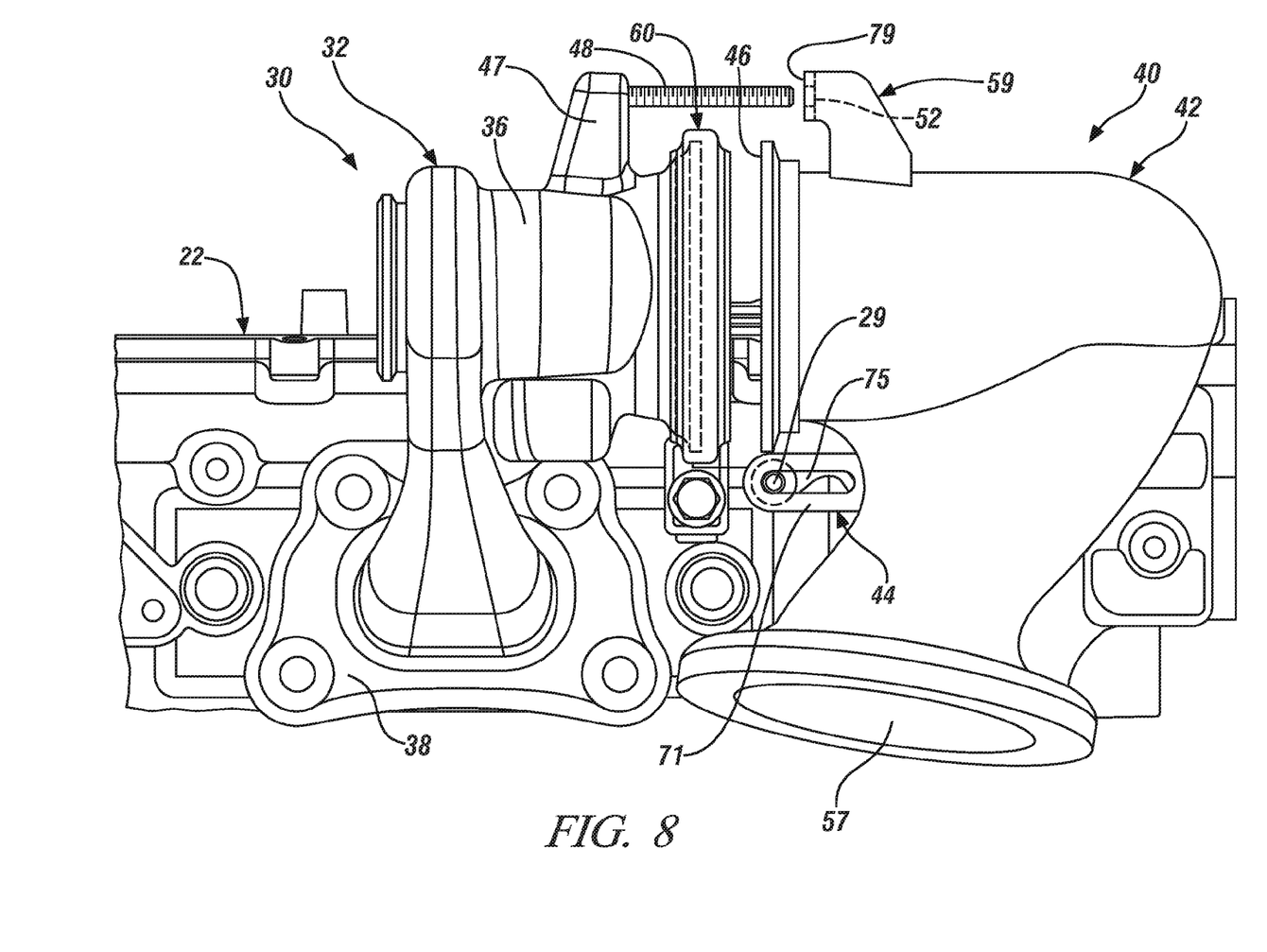
FIG. 8 is a front perspective view of the subassembly of FIG. 7.
Figure 11:
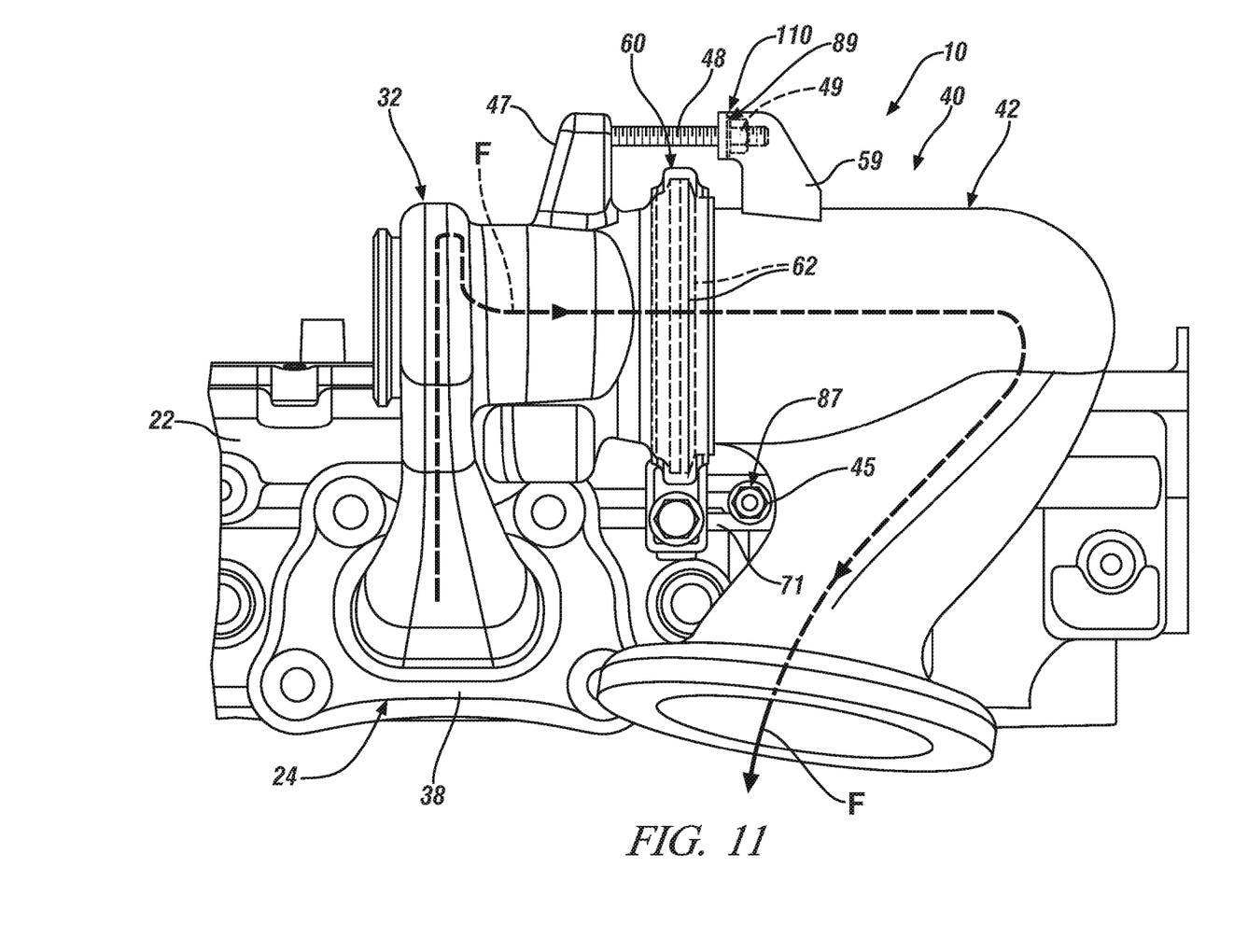
FIG. 11 is a front perspective view of an exemplary embodiment of a cylinder head, turbine and exhaust conduit assembly as disclosed herein.

As shown in FIGS. 7 and 8, in accordance with the method 200 of assembly 10, the exhaust conduit 42 is movably and slidingly disposed on the cylinder head 22 by positioning the slot 75 in the cylinder head bracket 44 onto the threaded stud 29 projecting from the cylinder head 22 followed by threading a threaded nut 45 onto the threaded stud 29 sufficiently (e.g., approximately finger tight) to secure the bracket and exhaust conduit 42 to the cylinder head 22 while also maintaining movable disposition of the bracket with respect to the threaded stud 29, wherein the bracket is free to slide back and forth along the slot 75 using the threaded stud 29 as a guide. The overall designs and positions of cylinder head bracket 44 and turbine bracket 59 on the exhaust conduit 42 are designed and selected such that the movable disposition of the exhaust conduit 42 on the cylinder head 22 positions the bore 52 of the turbine bracket 59 in axial alignment with the threaded stud 48 projecting from the protruding arm 47. The length of the slot 75 and position of the cylinder head bracket 44 on the surface of exhaust conduit 42 are selected to permit the bore 52 in the base 79 of the bracket 59 to pass onto and engage the threaded stud 48 such that it may be secured by threaded nut 49 (FIG. 11). The exhaust conduit 42 is also designed and selected so that the movable disposition of the exhaust conduit 42 on the cylinder head 22 described above moves the guide or pilot portion 43 of the turbine housing 36 proximate the turbine outlet 39 into axial alignment with the exhaust conduit inlet 46. The pilot portion 43 comprises a circumferential protrusion or lip extending axially from the surface of the turbine outlet flange 41.

Figure 9:
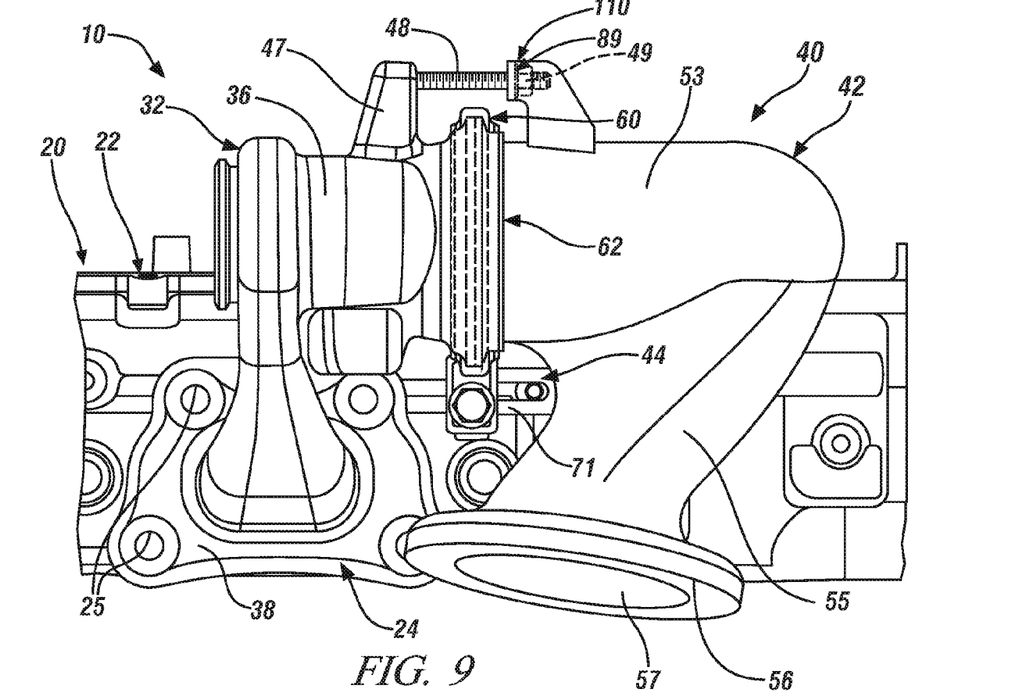
FIG. 9 is a front perspective view of the subassembly of FIG. 7 wherein the exhaust conduit has been moved into engagement with and has been attached to the turbine.
Figure 10:
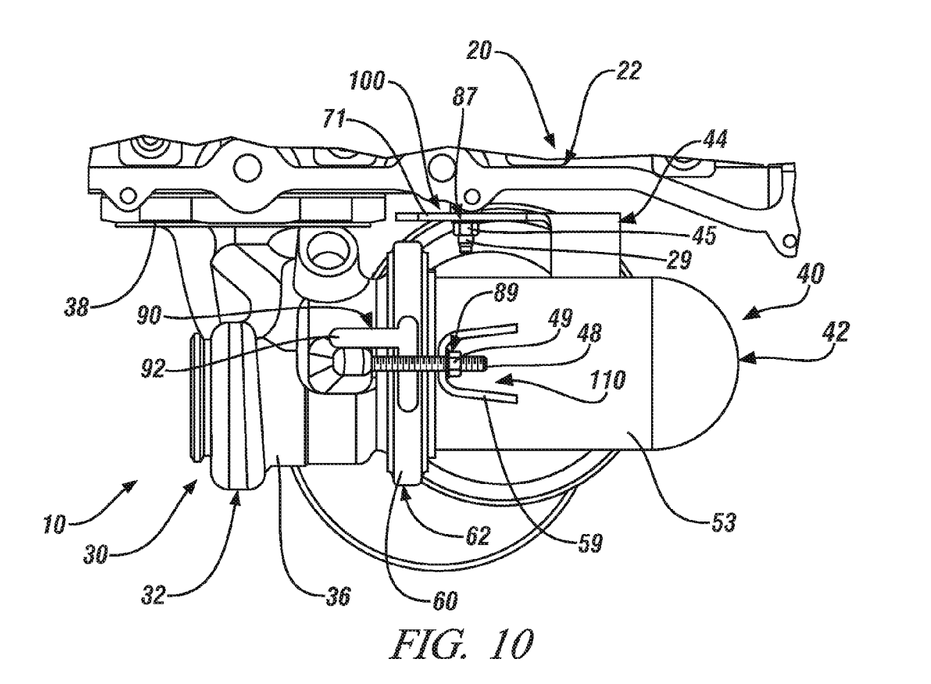
FIG. 10 is a top perspective view of the subassembly of FIG. 9.

As shown in FIGS. 9 and 10, in accordance with the method 200 of making the assembly 10, the exhaust conduit 42 is moved with the cylinder head bracket 44 acting as a guide into seated engagement with the turbine 32 and turbine housing 36. The pilot 43 provides indexing of the turbine housing 36 and turbine outlet 39 as it is inserted into the counterbore 93 of the exhaust conduit 42 and exhaust conduit inlet 46. The pilot 43 and counterbore 93 (FIGS. 13 and 14) act as a third assembly aid 120 as they assist the operator to align and connect the turbine 32 and exhaust conduit 42 to form the sealed joint 62 between them. They also reduce the possibility of damage to the seal 62 (e.g., damage to the coatings or surface of a gasket 83) caused by bringing the turbine 32 and exhaust conduit into contact when they are misaligned such that the mating surfaces of their flanges scratch, scrape or otherwise damage the gasket 83 surface. Further, in the embodiment of FIG. 14, the pilot 43 is nested within the counterbore 93 and prevents the direct impingement of hot exhaust gases on the gasket 83. Although not shown, one of skill will also understand that the third assembly aid 120 could also incorporate a reversed arrangement where the pilot is incorporated on the exhaust conduit inlet flange so that it could be inserted into the counterbore of the turbine outlet flange. If the V-band clamp 64 has been positioned adjacent to the turbine outlet flange 41, it may be expanded and positioned with the V-shaped channel 69 over the turbine outlet flange 41 and exhaust conduit inlet flange 51 where it may subsequently be released to allow the V-shaped channel 69 to engage the flanges. Alternately, if the V-band clamp 64 has been positioned over the turbine outlet flange 41, it may be expanded and positioned with the V-shaped channel 69 over the turbine outlet flange 41 and exhaust conduit inlet flange 51 where it may subsequently be released to allow the V-shaped channel 69 to engage the flanges. The method 200 of making the assembly 10 may also optionally include placing a ring-shaped, high temperature gasket 83 (FIG. 14) between the turbine outlet flange 41 and the exhaust conduit inlet flange 51, such as by sliding the gasket over the pilot 81 prior to bringing the flanges into seated engagement as described above. Any suitable gasket 83 or seal may be used, including, for example, various conventional compressible stainless steel gaskets or seals. After seating the turbine 32 and exhaust conduit 42 as described above, the threaded nut 49 may be threaded against the turbine bracket 59 sufficiently to secure their positions, such as by finger tightening the threaded nut 49 against the bracket.

Figure 12:
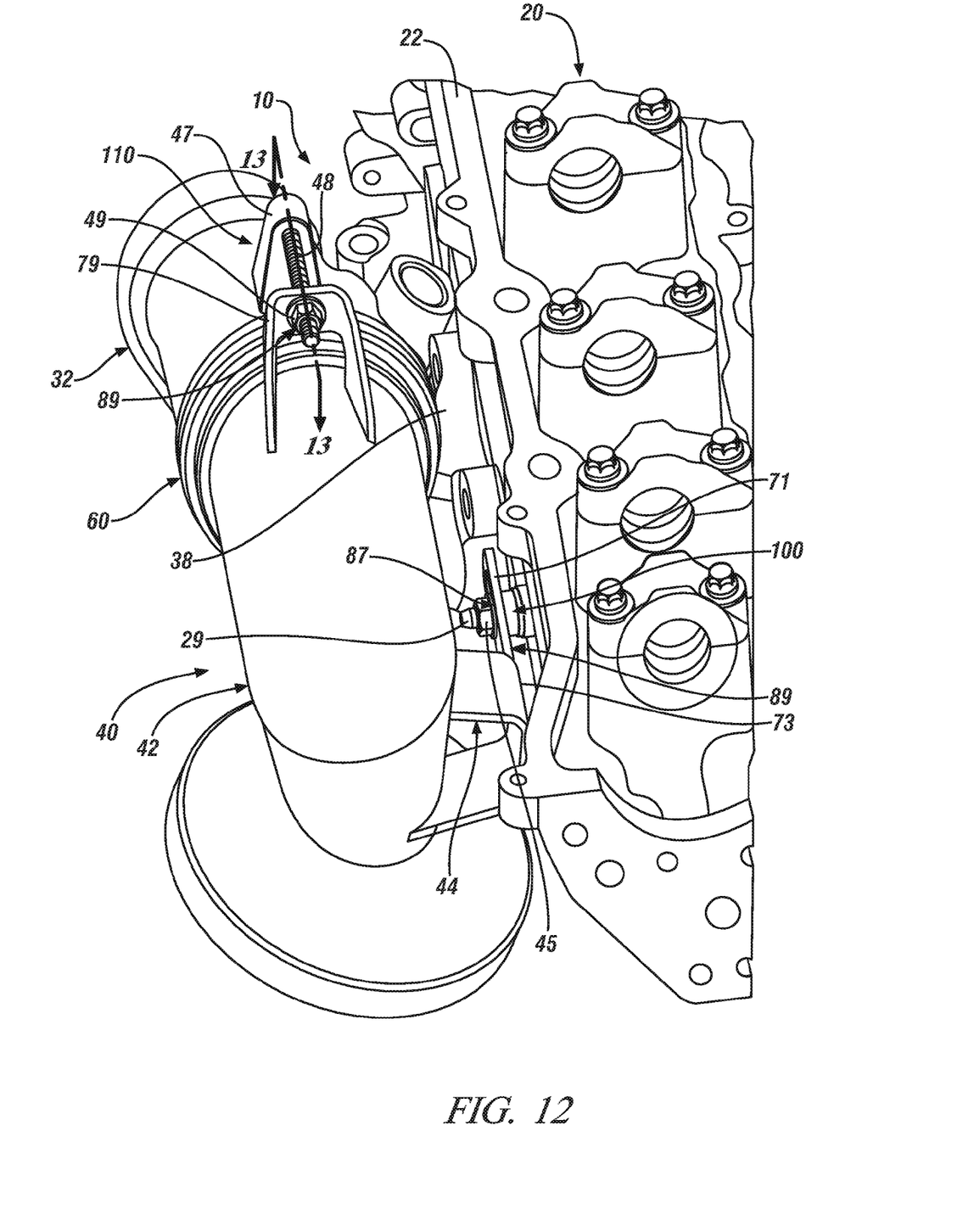
FIG. 12 is a side perspective view of the assembly of FIG. 11.

As shown in FIGS. 11 and 12, once the turbine 32 and exhaust conduit 42 have been seated and secured to one another as described above, the joints described above may be formed by securing the fasteners. In one exemplary embodiment, the clamping device 60 may be tightened to secure the sealed joint 62 between the turbine outlet 39 and exhaust conduit inlet 46 (FIGS. 13 and 14), such as by tightening the clamping device 60 to a predetermined load, including a predetermined torque. This may be followed by tightening the mechanical joint 89 between the threaded stud 48 extending from the protruding arm 47 and the turbine bracket 59, such as by tightening the threaded nut 49 to a predetermined load, including a predetermined torque. This may in turn be followed by tightening the mechanical joint 87 between the threaded stud 29 extending from the cylinder head 22 and the cylinder head bracket 44, such as by tightening the threaded nut 45 to a predetermined load, including a predetermined torque. The joints described herein may be formed by tightening of the respective elements in the manner described above in any predetermined order, and is not intended to be limited to the sequence described above.

As illustrated in FIG. 13, the sealed joint 62 between the turbine 32 and exhaust conduit 42 may be formed by tightening the sealing surface 85 of the turbine outlet flange 41 to the sealing surface 91 of the exhaust conduit inlet flange 51. These sealing surfaces may be prepared to provide sealed engagement by preparation of their surfaces, including machining or grinding of the surfaces prior to their engagement. Alternately, a gasket 83 as described herein may be interposed between the sealing surface 85 of the turbine outlet flange 41 and the sealing surface 91 of the exhaust conduit inlet flange 51 to secure the sealed engagement of these surfaces as illustrated in FIG. 14.

Figure 15:
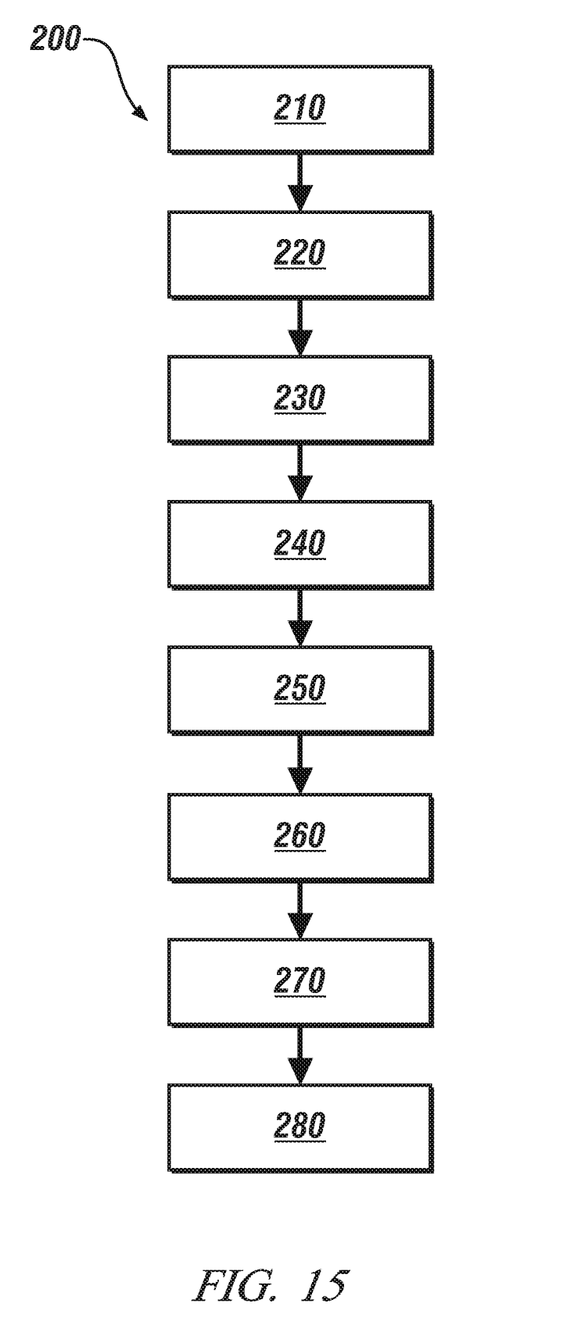
FIG. 15 is a flow diagram of an embodiment of a method of making an engine assembly as disclosed herein.

Referring to FIG. 15, the method 200 includes removably and sealably mounting 210 the turbine inlet mounting flange to the exhaust port mounting flange as described herein. The method 200 also includes using 220 the first assembly aid 100 to form a slidable joint and dispose the exhaust conduit 42 on the cylinder head 22 as described herein. The method 200 further includes using 230 the second assembly aid 110 to form a movable joint between the turbine housing 36 and the exhaust conduit 42 and movably align and dispose the turbine outlet flange 41 on the exhaust conduit inlet flange 51 as described herein. The method 200 yet further includes using 240 the third assembly aid 120 to pilotingly engage the turbine outlet flange 41 and the exhaust conduit inlet flange 51. Still further, the method 200 includes circumferentially disposing 250 the clamp 60 about the turbine outlet flange 41 and the exhaust conduit inlet flange 51. The method also includes tightening 260 the second assembly aid 110 sufficiently to form an immovable joint between the turbine housing and the exhaust conduit. The method 200 further includes tightening 270 the clamp 60 to form a sealed joint 62 between the turbine outlet flange 41 and the exhaust conduit inlet flange 51. The method 200 still further includes tightening 280 the first assembly aid 100 to form a fixed joint and dispose the exhaust conduit 42 on the cylinder head 22.

The method 200 of making the assembly 10 described herein may also be used in conjunction with an assembly (not shown) of the turbocharger 30 compressor (not shown), intake conduit (not shown) of an intake system (not shown) and cylinder head 22 of engine 20, wherein the references herein to the exhaust conduit 42 and its elements may be substituted for the intake conduit and the references to the turbine 32 and its elements may be substituted for the compressor, and references to the exhaust port 26 may be substituted for an intake port (not shown).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of making an engine assembly, comprising: a cylinder head having an exhaust port and an exhaust port mounting flange disposed proximate the exhaust port; a turbocharger having a turbine, the turbine having a turbine housing, the turbine housing comprising a turbine inlet and turbine outlet, the turbine inlet configured to receive an exhaust flow from the exhaust port and fluidly communicate the exhaust flow through the turbine housing to the turbine outlet, the turbine inlet comprising a turbine inlet mounting flange that is removably mounted on and in sealed engagement with the exhaust port mounting flange, the turbine outlet comprising a turbine outlet mounting flange; an exhaust conduit, the exhaust conduit comprising an exhaust conduit inlet, the exhaust conduit inlet configured to receive the exhaust flow from the turbine outlet, the exhaust conduit inlet comprising an exhaust conduit inlet mounting flange that is removably mounted on and in sealed engagement with the turbine outlet flange; a first assembly aid disposed between the exhaust conduit and the cylinder head; a second assembly aid axially disposed between the turbine housing proximate the turbine outlet and the exhaust conduit proximate the exhaust conduit inlet and configured to provide alignment of the turbine outlet mounting flange and exhaust conduit inlet mounting flange; a third assembly aid disposed circumferentially about and configured to provide nested engagement of the turbine outlet and the exhaust conduit inlet; and a clamp configured for sealing attachment of the exhaust conduit inlet mounting flange to the turbine outlet mounting flange, wherein the first assembly aid comprises a joint between the cylinder head and the exhaust conduit, the second assembly aid comprises a first joint between the turbine and the exhaust conduit and the third assembly aid comprises a second joint between the turbine and the exhaust conduit; using a single human assembler, comprising:

removably and sealably mounting the turbine inlet mounting flange to the exhaust port mounting flange;

using the first assembly aid to form a slidable joint and dispose the exhaust conduit on the cylinder head;

using the second assembly aid to form a movable joint between the turbine housing and the exhaust conduit and movably align and dispose the turbine outlet mounting flange on the exhaust conduit inlet mounting flange;

using the third assembly aid to pilotingly engage the turbine outlet mounting flange and the exhaust conduit inlet mounting flange;

circumferentially disposing the clamp about the turbine outlet mounting flange and the exhaust conduit inlet mounting flange;

tightening the second assembly aid sufficiently to form an immovable joint between the turbine housing and the exhaust conduit;

tightening the clamp to form a sealed joint between the turbine outlet mounting flange and the exhaust conduit inlet mounting flange; and tightening the first assembly aid to form a fixed joint and dispose the exhaust conduit on the cylinder head.

2. The method of claim 1, wherein the first assembly aid comprises:

one of a threaded stud protruding from or a threaded bore into the cylinder head;

a head bracket attached to the exhaust conduit having a bore that is configured to capture the stud and preposition the exhaust conduit adjacent to the cylinder head; and one of a threaded nut for attachment to the threaded stud or a threaded bolt for attachment to the threaded bore configured to secure the bracket to the cylinder head, wherein using the first assembly aid to form a slidable joint and dispose the exhaust conduit on the cylinder head comprises finger-tightening one of the threaded nut to the threaded stud or the threaded bolt to the threaded bore sufficiently to secure the bracket to the cylinder head and form the slidable joint.

3. The method of claim 1, wherein the second assembly aid comprises:

an axially extending threaded stud attached to the turbine housing proximate the turbine outlet mounting flange and protruding toward the exhaust conduit and configured for aligned engagement with, and attachment of, the exhaust conduit; and a turbine bracket attached to the exhaust conduit having a bore that is configured to capture the threaded stud and preposition the exhaust conduit mounting flange and exhaust conduit inlet mounting flange for sealing engagement; and a threaded nut that is configured to secure the bracket to the threaded stud, wherein using the second assembly aid to form a movable joint between the turbine housing and the exhaust conduit and movably align and dispose the turbine outlet flange on the exhaust conduit inlet flange comprises finger-tightening the threaded nut to the threaded stud sufficiently to secure the bracket to the turbine housing and form the slidable joint.

4. The method of claim 1, wherein the third assembly aid comprises: a circumferential axially protruding pilot portion disposed on one of the turbine inlet mounting flange or the exhaust conduit mounting flange and a mating counterbore disposed on the other of the turbine inlet mounting flange or the exhaust conduit mounting flange, wherein using the third assembly aid to pilotingly engage the turbine outlet mounting flange and the exhaust conduit inlet mounting flange comprises inserting the protruding pilot portion into the counterbore.

5. The method of claim 1, further comprising disposing a gasket between the turbine outlet mounting flange and the exhaust conduit inlet mounting flange.

6. The method of claim 5, wherein the protruding pilot portion and counterbore are nested so as to eliminate direct impingement of an exhaust gas flow through them on the first gasket.

7. The method of claim 1, wherein the clamp is circumferentially disposed about one of the turbine outlet mounting flange or the exhaust conduit inlet mounting flange prior to using the second assembly aid.

8. The method of claim 1, wherein the clamp comprises an anti-rotation feature that limits rotation of the clamp during tightening the clamp to form a sealed joint between the turbine outlet flange and the exhaust conduit inlet flange.

9. The method of claim 8, wherein the anti-rotation feature comprises an axially extending tang that engages the turbine housing to limit rotation of the clamp during tightening.

10. The method of claim 1, further comprising disposing a gasket between the turbine inlet mounting flange and the exhaust port mounting flange prior to removably and sealably mounting the turbine inlet mounting flange and the exhaust port mounting flange.

11. An engine assembly, comprising:

a cylinder head having an exhaust port and an exhaust port mounting flange disposed proximate the exhaust port;

a turbocharger having a turbine, the turbine having a turbine housing, the turbine housing comprising a turbine inlet and turbine outlet, the turbine inlet configured to receive an exhaust flow from the exhaust port and fluidly communicate the exhaust flow through the turbine housing to the turbine outlet, the turbine inlet comprising a turbine inlet mounting flange that is removably mounted on and in sealed engagement with the exhaust port mounting flange, the turbine outlet comprising a turbine outlet mounting flange;

an exhaust conduit, the exhaust conduit comprising an exhaust conduit inlet, the exhaust conduit inlet configured to receive the exhaust flow from the turbine outlet, the exhaust conduit inlet comprising an exhaust conduit inlet mounting flange that is removably mounted on and in sealed engagement with the turbine outlet flange;

a first assembly aid disposed between the exhaust conduit and the cylinder head;

a second assembly aid axially disposed between the turbine housing proximate the turbine outlet and the exhaust conduit proximate the exhaust conduit inlet and configured to provide alignment of the turbine outlet flange and exhaust conduit inlet mounting flange;

a third assembly aid disposed circumferentially about and configured to provide nested engagement of the turbine outlet and the exhaust conduit inlet; and a clamp configured for sealing attachment of the exhaust conduit inlet mounting flange to the turbine outlet mounting flange, wherein the first assembly aid comprises a joint between the cylinder head and the exhaust conduit, the second assembly aid comprises a first joint between the turbine and the exhaust conduit and the third assembly aid comprises a second joint between the turbine and the exhaust conduit.

12. The engine assembly of claim 11, wherein the third assembly aid comprises a circumferential axially protruding pilot portion disposed on one of the turbine inlet mounting flange or the exhaust conduit mounting flange and a mating counterbore disposed on the other of the turbine inlet mounting flange or the exhaust conduit mounting flange.

13. The engine assembly of claim 12, further comprising a first gasket disposed between and contributing to the sealed engagement of the turbine outlet mounting flange and the exhaust conduit inlet mounting flange.

14. The engine assembly of claim 13, wherein the protruding pilot portion and counterbore are nested so as to eliminate direct impingement of an exhaust gas flow through them on the first gasket.

15. The engine assembly of claim 11, wherein the second assembly aid comprises:
an axially extending threaded stud attached to the turbine housing proximate the turbine outlet mounting flange and protruding toward the exhaust conduit and is configured for aligned engagement with and attachment of the exhaust conduit; and
a turbine bracket attached to the exhaust conduit having a bore that is configured to capture the stud and preposition the exhaust conduit mounting flange and exhaust conduit inlet mounting flange for sealing engagement; and
a threaded nut that is configured to secure the bracket to the threaded stud.

16. The engine assembly of claim 11, wherein the first assembly aid comprises:
one of a threaded stud protruding from or threaded bore into the cylinder head;
a head bracket attached to the exhaust conduit having a bore that is configured to capture the stud and preposition the exhaust conduit adjacent to the cylinder head; and
one of a threaded nut for attachment to the threaded stud or a threaded bolt for attachment to the threaded bore configured to secure the bracket to the cylinder head.

17. The engine assembly of claim 16, wherein the head bracket comprises a slot configured to enable the slidable movement of the exhaust conduit relative to the cylinder head to preposition the exhaust conduit adjacent to the cylinder head.

18. The engine assembly of claim 11, wherein the clamp comprises an anti-rotation feature.

19. The engine assembly of claim 18, wherein the anti-rotation feature comprises an axially extending tang that is configured to engage the turbine housing.

20. The engine assembly of claim 11, further comprising a gasket disposed between the turbine outlet mounting flange and the exhaust conduit inlet mounting flange.

* * * * *